(12) United States Patent
Sayyah et al.

(10) Patent No.: US 11,105,900 B2
(45) Date of Patent: Aug. 31, 2021

(54) SINGLE MEMS MIRROR CHIP SCALE LIDAR

(71) Applicant: GM GLOBAL TECHNOLOGY OPERATIONS LLC, Detroit, MI (US)

(72) Inventors: Keyvan Sayyah, Santa Monica, CA (US); Pamela R. Patterson, Los Angeles, CA (US); Raymond Sarkissian, Studio City, CA (US); Richard Kremer, Calabasas, CA (US); Oleg Efimov, Thousand Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 503 days.

(21) Appl. No.: 16/059,473

(22) Filed: Aug. 9, 2018

(65) Prior Publication Data

US 2020/0049801 A1     Feb. 13, 2020

(51) Int. Cl.
G01S 7/48     (2006.01)
G01S 7/481    (2006.01)
G02B 26/08    (2006.01)
G01S 17/34    (2020.01)

(52) U.S. Cl.
CPC ............ G01S 7/4817 (2013.01); G01S 17/34 (2020.01); G02B 26/0833 (2013.01)

(58) Field of Classification Search
CPC ........ G01S 7/4812; G01S 17/89; G02F 1/292; G01B 9/02004; G01B 2290/70
See application file for complete search history.

(56) References Cited

U.S. PATENT DOCUMENTS

2017/0299697 A1*  10/2017  Swanson ............ G01B 9/02004
2019/0343377 A1*  11/2019  Fan .................... G01B 11/2441

\* cited by examiner

*Primary Examiner* — Luke D Ratcliffe
(74) *Attorney, Agent, or Firm* — Cantor Colburn LLP

(57) ABSTRACT

A chip-scale LIDAR (light detection and ranging) system, optical package and LIDAR platform. The system includes a photonic chip, a laser associated with the photonic chip, an optical circulator, and a MEMS scanner. The laser, the optical circulator and the MEMS scanner are collinear. The photonic chip includes an edge coupler. The optical package includes a housing having an aperture, and a platform within the housing. The platform includes the laser, an optical circulator, and MEMS scanner.

20 Claims, 3 Drawing Sheets

SINGLE MEMS MIRROR CHIP SCALE LIDAR

INTRODUCTION

The subject disclosure relates to a chip-scale LIDAR (light detection and ranging) system and, in particular, to a package and architecture for a chip-scale LIDAR.

LIDAR is a remote sensing method that uses light in the form of a pulsed or frequency or phase modulated laser to measure ranges and other parameters of selected objects. Increasingly, uses for LIDAR systems require reduced form factors and lighter weights, while still providing reliable measurements. Accordingly, it is desirable to provide a LIDAR system that is lightweight and small.

SUMMARY

In one exemplary embodiment, a chip-scale LIDAR (light detection and ranging) system is disclosed. The system includes a photonic chip, a laser associated with the photonic chip, an optical circulator, and a MEMS scanner, wherein the laser, the optical circulator and the MEMS scanner are collinear.

In addition to one or more of the features described herein, the system includes a mirror for directing a returning light beam diverted by the optical circulator towards an edge coupler. The system includes a housing including an aperture, wherein the MEMS scanner directs light from the laser through the aperture. The light from the laser is incident on a reflective face of the MEMS scanner at a non-zero angle. The optical circulator is placed on a horizontal surface of an optical sub mount and the MEMS scanner is placed on a surface at a non-zero angle to the horizontal surface of the optical sub mount. The system further includes a circuit board for controlling operation of the laser and the MEMS scanner. The system further includes an optical frequency shifter associated with the light source for shifting a local oscillator frequency at the light source.

In another exemplary embodiment, a LIDAR (light detection and ranging) platform is disclosed. The LIDAR platform includes a photonic chip having a laser and an edge coupler, an optical circulator, and a MEMS scanner, wherein the laser, the optical circulator and the MEMS scanner are collinear.

In addition to one or more of the features described herein, the LIDAR platform includes a mirror for directing a returning light beam diverted by the optical circulator towards the edge coupler of the photonic chip. The LIDAR platform includes a housing including an aperture, wherein the MEMS scanner directs light from the laser through the aperture. The light from the laser is incident on a reflective face of the MEMS scanner at a non-zero angle. The optical circulator is placed on a horizontal surface and the MEMS scanner is placed on a surface at a non-zero angle to the horizontal surface. The LIDAR platform further includes a circuit board for controlling operation of the laser and the MEMS scanner. The LIDAR platform further includes an optical frequency shifter associated with the light source for shifting a local oscillator frequency at the light source.

In yet another exemplary embodiment, an optical package for a chip-scale LIDAR (light detection and ranging) is disclosed. The optical package includes a housing having an aperture, and a platform within the housing. The platform includes a laser associated with a photonic chip, an optical circulator, and a MEMS scanner, wherein the light source, the optical circulator and the MEMS scanner are collinear.

In addition to one or more of the features described herein, the platform includes a mirror for directing a returning light beam diverted by the optical circulator towards an edge coupler of the photonic chip. The MEMS scanner directs light from the laser through the aperture. The light from the laser is incident on a reflective face of the MEMS scanner at a non-zero angle. The optical circulator is placed on a horizontal surface of the platform and the MEMS scanner is placed on a surface at a non-zero angle to the horizontal surface. The optical package further includes a circuit board for controlling operation of the laser and the MEMS scanner.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
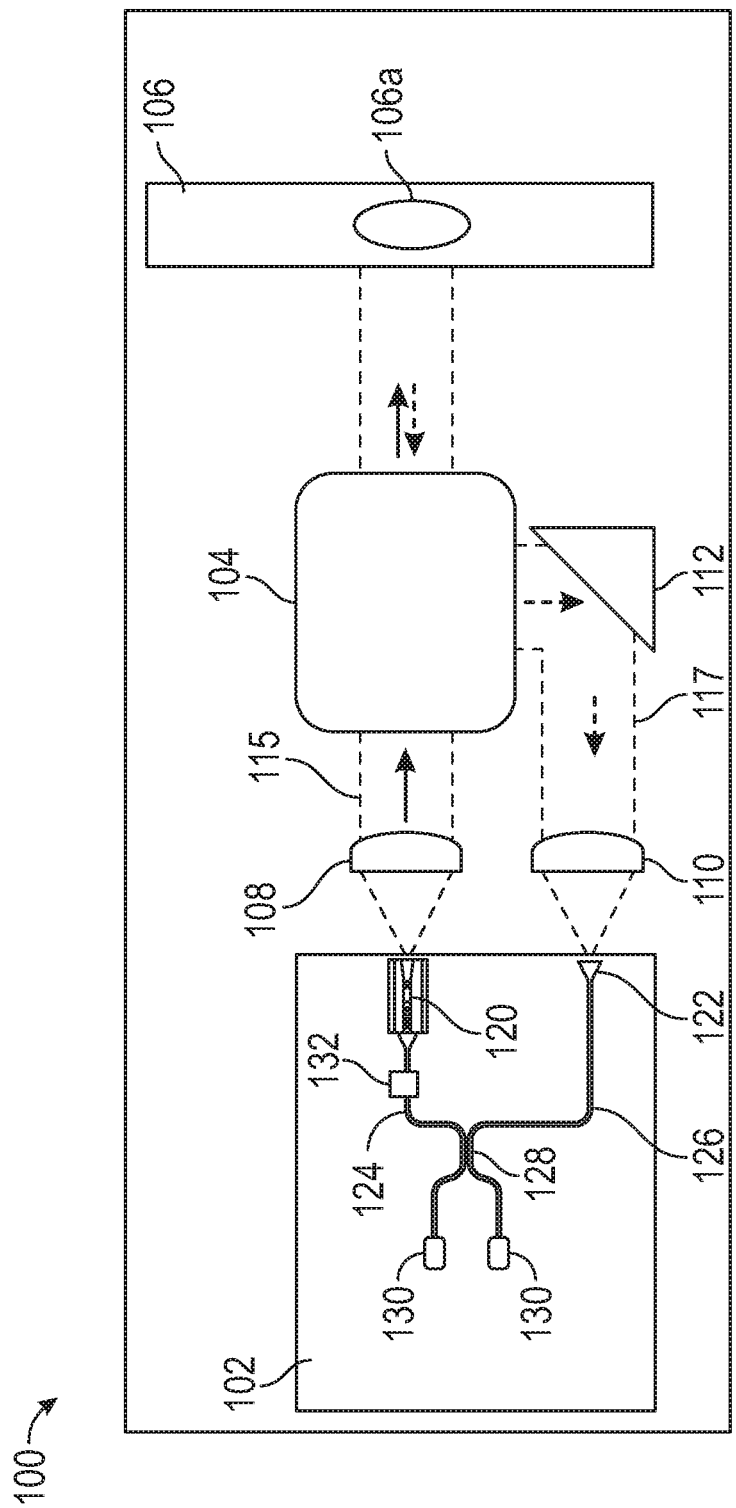
FIG. 1 shows a plan view of a chip-scale LIDAR system.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a plan view of a chip-scale LIDAR system 100. The chip-scale LIDAR system 100 includes a photonic chip 102, an optical circulator 104 and a microelectromechanical system (MEMS) scanner 106. Additionally, the LIDAR system 100 includes a first collimating lens 108, a second focusing lens 110 and a turning mirror 112.

The photonic chip 102 is a scanning frequency modulated continuous wave (FMCW) LIDAR chip. The photonic chip 102 can be a silicon photonic chip in various embodiments. The photonic chip 102 includes a laser 120 or other suitable light source for generating a light beam, an edge coupler 122 for receiving incoming light at the photonic chip 102, a first waveguide 124, a second waveguide 126, a multi-mode interference (MMI) coupler or directional coupler 128 and photodetectors 130. The laser 120 can be integrated into the photonic chip 102. In various embodiments, the laser 120 is a master oscillator power amplifier (MOPA) 1550 nanometer laser. The laser 120 includes a front side from which a light beam is transmitted out of the photonic chip 102. The laser 120 also includes a back side from which a smaller amount of light escapes the laser. The light emitted from the back side of the laser 120 is captured by first waveguide 124 which directs the captured light toward photodetectors 130. The light in the first waveguide 124 constitutes a local oscillator (LO) signal that is compared with incoming light to obtain range and Doppler frequency measurements. A frequency shifter 132, associated with the first waveguide 124, shifts the frequency of the local oscillator to allow unambiguous Doppler measurement. Second waveguide 126 is connected to the edge coupler 212 and captures light received at the edge coupler 122 and directs the captured light toward the photodetectors 130. The MMI or directional coupler 128 provides optical mixing between the light in the first waveguide 124 and the light in the second waveguide 126 at a location in front of the photodetectors 130. Thus, light in first waveguide 124 and light in second waveguide 126 pass through the MMI or directional coupler 128 prior to being received at photodetectors 130.

Laser 120 transmits a first light beam 115 that passes through the first collimating lens 108 and the optical circulator 104 to impinge on a reflective face 106a of the MEMS scanner 106. The first light beam 115 is a diverging beam as it exits the laser 120. First collimating lens 108 changes the divergence of the first light beam 115 to produce a collimated light beam. The first light beam 115 then passes through the optical circulator 104 to impinge on the reflective face 106a. In various embodiments, the optical path of the light from the laser 120 to the reflective face 106a is a straight, or substantially straight, line. In other words, the laser 120, collimating lens 108, optical circulator 104 and reflective face 106a are substantially collinear.

A second light beam 117 returning from the MEMS scanner 106 passes through the optical circulator 104, which diverts the optical path of the second light beam 117. Mirror 112 receives the second light beam 117 from the optical circulator 104 and directs the second light beam 117 in the direction of the edge coupler 122 of the photonic chip 102. The focusing lens 110 causes the second light beam 117 to converge onto edge coupler 122 to enter the photonic chip 102. The edge coupler 122 is located at a selected distance from the laser 120.

Figure 2:
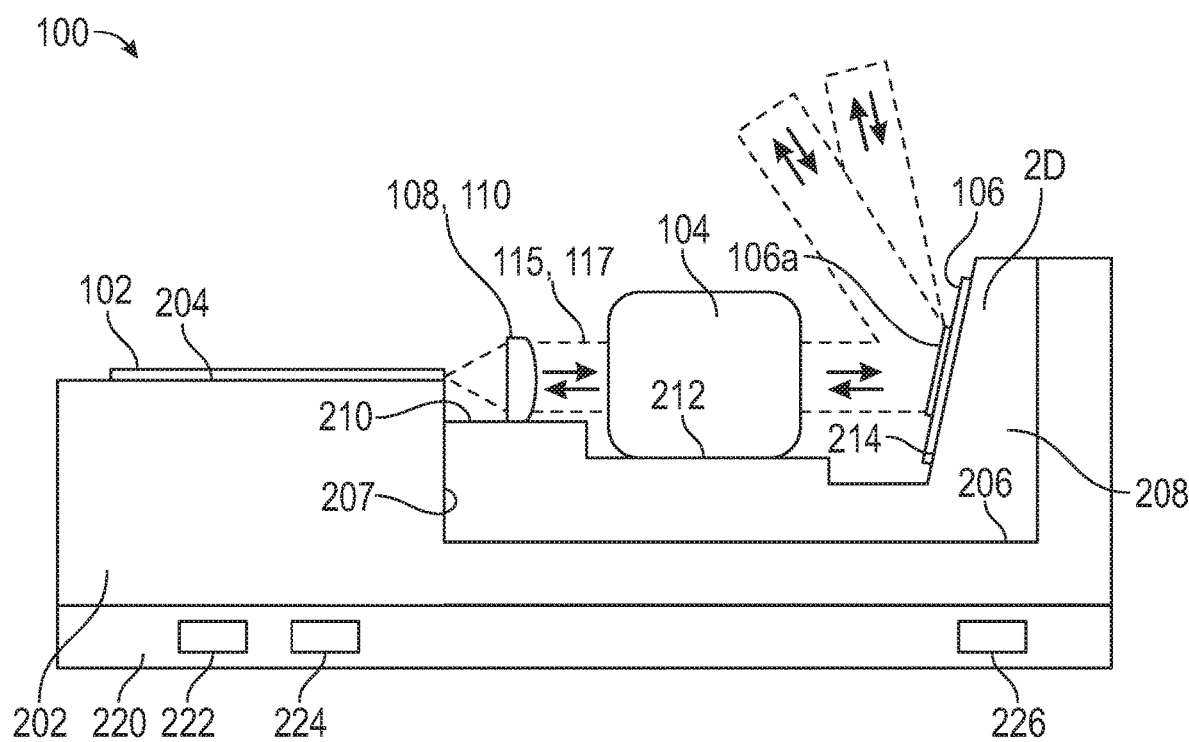
FIG. 2 shows a side view of the chip-scale LIDAR system of FIG. 1.

FIG. 2 shows a side view of the chip-scale LIDAR system 100. A platform of the LIDAR system 100 is configured to accommodate a selected architecture for the elements of the LIDAR system 100. A LIDAR integration platform 202 includes a surface 204 and a pocket 206. The photonic chip 102 is affixed to the surface 204 of the LIDAR integration platform 202. In various embodiments, a side of the photonic chip 102 having the laser 120 and edge coupler 122 is coplanar with a wall 207 of the pocket 206. An optical sub mount 208 is formed in or placed into the pocket 206. The optical sub mount 208 supports the free-space optics of the LIDAR system 100, such as the optical circulator 104, MEMS scanner 106, collimating lens 108, focusing lens 110, and mirror 112. The optical sub mount 208 includes a configuration of support surfaces 210, 212, 214 that allow for a straight or substantially straight path for the first light beam 115 once the optical sub mount 208 has been placed in the pocket 206 of the LIDAR integration platform 202. The collimating lens 108 and the focusing lens 110 are placed on first support surface 210 and the optical circulator 104 is placed on second support surface 212. In various embodiments, the second support surface 212 is lower than the first support surface 210 and the first support surface 210 is lower than surface 204 of the LIDAR integration platform 202, as viewed in FIG. 2. The configuration of support surfaces 204, 210 and 212 allows for alignment of the laser 102, first collimating lens 108 and optical circulator 104 to allow the first light beam 115 to pass through these elements in a substantially straight line.

Optical sub mount 208 further includes third support surface 214 for supporting the MEMS scanner 106. The third support surface is at an angle to the first support surface 210 and/or second support surface 212. The angle of the third support surface is selected in order to reflect the first light beam 115 from the MEMS scanner through a selected solid angle. Also, the angle is such that an incoming second light beam 117 is reflected at the MEMS scanner 106 into the optical circulator 104. The MEMS scanner 106 can be a two-dimensional MEMS scanner. In various embodiments, the MEMS scanner 106 includes resonant fast and quasi-static slow axes with angular ranges extending over +/−50° and +/−20°, respectively. In various embodiments, the MEMS scanner 106 controls directing transmission of the first of beam light 115 from the laser 102 towards an object and also controls directing a second light beam 117 incoming from the object.

The LIDAR integration platform 202 is attached to a LIDAR post detection electronics printed circuit board (PCB) 220. In various embodiments, LIDAR integration platform is affixed on top of the PCB 220. PCB 220 includes various circuitry for operation of the electronics of the LIDAR system 100. For example, the PCB 220 includes a laser driver circuit 222 for operation of laser 120, a photodetector circuit 224 for reading and processing data from the photodetectors 130 and a MEMS scanner driver 226 for controlling operation and angular deviation of the reflective surface 106a of the MEMS scanner 106. The photodetector circuit 224 can use light received at the photodetectors 130 to determine the range and velocity of an object with respect to LIDAR system 100 from differences between the optical frequency of the outgoing beam of light 115 and the incoming beam of light 117.

Figure 3:
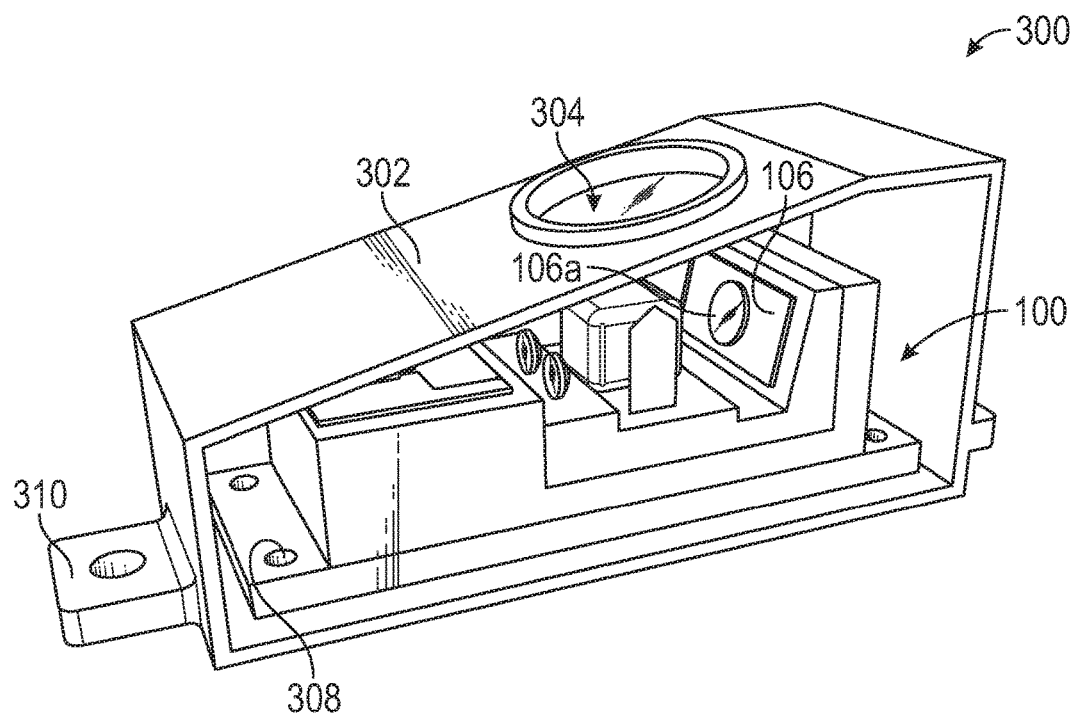
FIG. 3 shows a package for the LIDAR system of FIG. 1.

FIG. 3 illustrates a package 300 for the LIDAR system 100. The package 300 includes a housing 302 with an aperture 304. The LIDAR system 100 is placed in the housing 302 so that the outgoing beam reflected off reflective face 106a of the MEMS scanner 106 and the incoming light beam pass through the aperture 304. The aperture 304 may include a glass window or optically transparent material. The housing 302 includes internal mounts 308 for securing the LIDAR system 100 to the housing 302 and includes external mounts 310 for securing the package 300 to an article, such as a vehicle.

Figure 4:
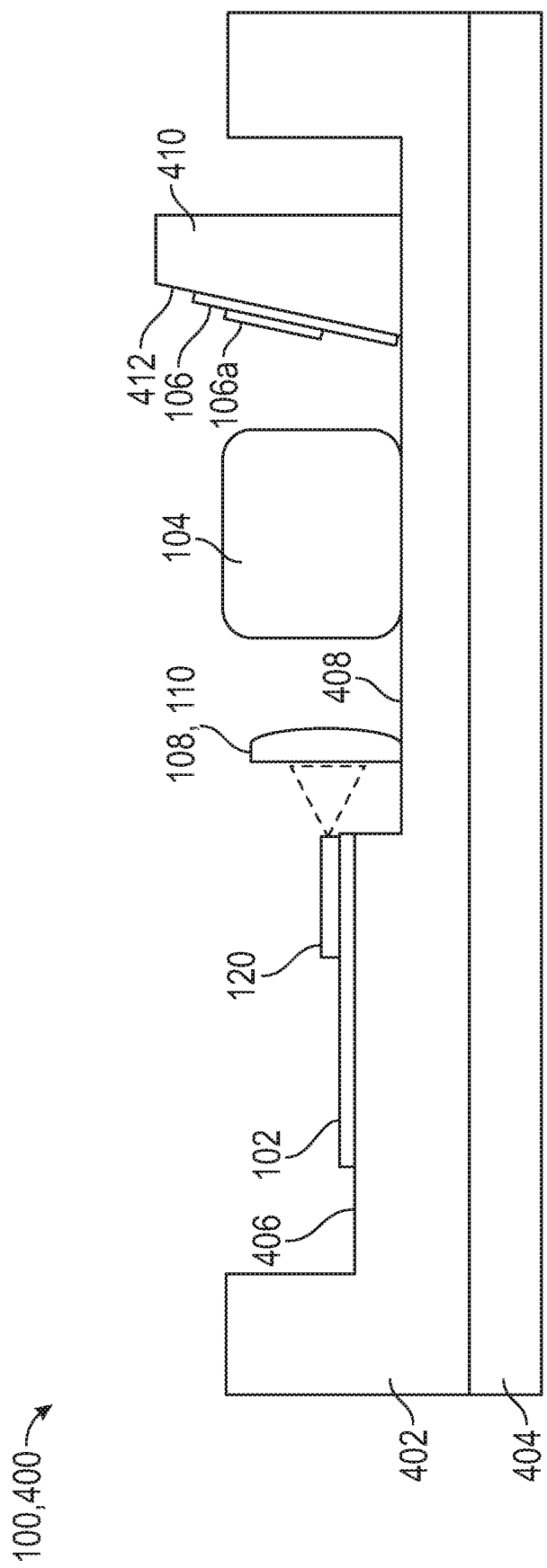
FIG. 4 shows a side view of a chip-scale LIDAR system in an alternate embodiment.

FIG. 4 illustrates a side view for a chip-scale LIDAR system 100 in an alternate embodiment 400. The platform includes an optoelectronics package 402 and a printed circuit board 404. The optoelectronic package 402 includes a first surface 406 and a second surface 408, with the second surface 408 being offset from the first surface 406 and lower than the first surface 406 as viewed in FIG. 4. The first surface 406 supports the photonic chip 102 and an associated laser 120. The associated laser 120 can be an integrated or on-chip laser or can be separate from the photonic chip 102. The second surface 408 supports the optical circulator 104, the collimating lens 108 and the focusing lens 110 and a MEMS support 410. The MEMS support 410 provides a surface 412 at an angle to the path of the light beam passing from the laser 120 through the optical circulator 140. The MEMS scanner 106 is supported at the surface to receive light from the laser 120 at a non-zero angle to the reflective face 106a. The light from the reflective face 106a passes through the aperture 304, of FIG. 3. The optoelectronic package 402 is attached on top of the printed circuit board 404. The printed circuit board 404 includes the various circuitry for operation of the LIDAR system 100 as, i.e., laser driver circuit, a photodetector circuit, a MEMS scanner driver, etc.

In various embodiments, the LIDAR system 100 can be associated with a vehicle and the object 110 can be any object external to the vehicle, such as another vehicle, a pedestrian, a telephone pole, etc. The LIDAR system 100 determines parameters such as range, and Doppler velocity as a function of the azimuth and elevation of the object 110 and the vehicle uses these parameters to navigate with respect to the object 110 for the purposes of avoiding contact with the object 110.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A chip-scale LIDAR (light detection and ranging) system, comprising:
    a photonic chip having an associated laser;
    an optical circulator;
    a MEMS scanner; and
    a package including a first surface, a second surface offset from the first surface and a third surface at a non-zero angle to the second surface, wherein the photonic chip is disposed along the first surface, the optical circulator is disposed on the second surface and the MEMS scanner is disposed on the third surface and the laser, the optical circulator and the MEMS scanner are collinear.

2. The system of claim 1, further comprising a mirror disposed on the second surface for directing a returning light beam diverted by the optical circulator towards an edge coupler of the photonic chip.

3. The system of claim 1, further comprising a housing including an aperture, wherein the MEMS scanner directs light from the laser through the aperture.

4. The system of claim 1, wherein the light from the laser is incident on a reflective face of the MEMS scanner at a non-zero angle.

5. The system of claim 1, wherein the first surface is included in the platform, the platform having a pocket, and the second surface and third surface are included in an optical submount that is configured to be placed in the pocket to make the laser, the optical circulator and the MEMS scanner collinear.

6. The system of claim 1, further comprising a circuit board for controlling operation of the laser and the MEMS scanner.

7. The system of claim 1, further comprising:
    an optical frequency shifter associated with the light source for shifting a local oscillator frequency at the light source.

8. A LIDAR (light detection and ranging) platform, comprising:
    a photonic chip having a laser and an edge coupler;
    an optical circulator;
    a MEMS scanner; and
    a package including a first surface, a second surface offset from the first surface and a third surface at a non-zero angle to the second surface, wherein the photonic chip is disposed along the first surface, the optical circulator is disposed on the second surface and the MEMS scanner is disposed on the third surface and the laser, the optical circulator and the MEMS scanner are collinear.

9. The LIDAR platform of claim 8, further comprising a mirror disposed on the second surface for directing a returning light beam diverted by the optical circulator towards the edge coupler of the photonic chip.

10. The LIDAR platform of claim 8, further comprising a housing including an aperture, wherein the MEMS scanner directs light from the laser through the aperture.

11. The LIDAR platform of claim 8, wherein the light from the laser is incident on a reflective face of the MEMS scanner at a non-zero angle.

12. The LIDAR platform of claim 8, wherein the first surface is included in the platform, the platform having a pocket, and the second surface and third surface are included in an optical submount that is configured to be placed in the pocket to make the laser, the optical circulator and the MEMS scanner collinear.

13. The LIDAR platform of claim 8, further comprising a circuit board for controlling operation of the laser and the MEMS scanner.

14. The LIDAR platform of claim 8, further comprising:
    an optical frequency shifter associated with the light source for shifting a local oscillator frequency at the light source.

15. An optical package for a chip-scale LIDAR (light detection and ranging), comprising:
    a housing having an aperture;
    a platform within the housing, the platform including:
        a laser associated with a photonic chip;
        an optical circulator;
        a MEMS scanner; and
        a package including a first surface, a second surface offset from the first surface and a third surface at a non-zero angle to the second surface, wherein the photonic chip is disposed along the first surface, the optical circulator is disposed on the second surface and the MEMS scanner is disposed on the third surface and the laser, the optical circulator and the MEMS scanner are collinear.

16. The optical package of claim 15, wherein the platform further comprises a mirror disposed on the second surface for directing a returning light beam diverted by the optical circulator towards an edge coupler of the photonic chip.

17. The optical package of claim 15, wherein the MEMS scanner directs light from the laser through the aperture.

18. The optical package of claim 15, wherein the light from the laser is incident on a reflective face of the MEMS scanner at a non-zero angle.

19. The optical package of claim 15, wherein the first surface is included in the platform, the platform having a pocket, and the second surface and third surface are included in an optical submount that is configured to be placed in the pocket to make the laser, the optical circulator and the MEMS scanner collinear.

20. The optical package of claim 15, further comprising a circuit board for controlling operation of the laser and the MEMS scanner.

\* \* \* \* \*